(No Model.) 3 Sheets—Sheet 1.
W. H. HOLLAR & F. S. HOLMES.
ELECTRIC LOCK.
No. 477,897. Patented June 28, 1892.
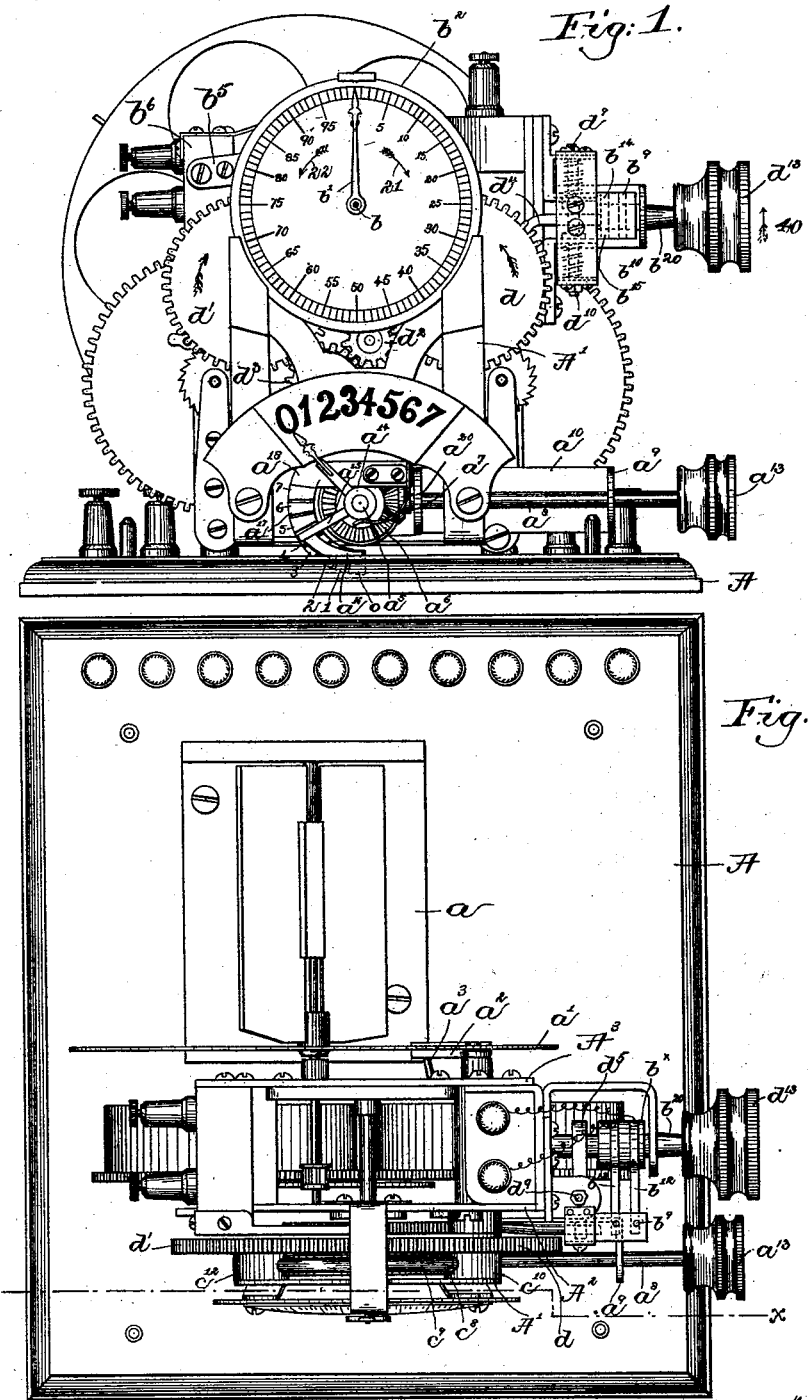
Witnesses.
Howard F. Eaton.
Inventors:
William H. Hollar,
Frederick S. Holmes,
by Crosby & Gregory Attys (No Model.) 3 Sheets—Sheet 2.
W. H. HOLLAR & F. S. HOLMES.
ELECTRIC LOCK.
No. 477,897. Patented June 28, 1892.
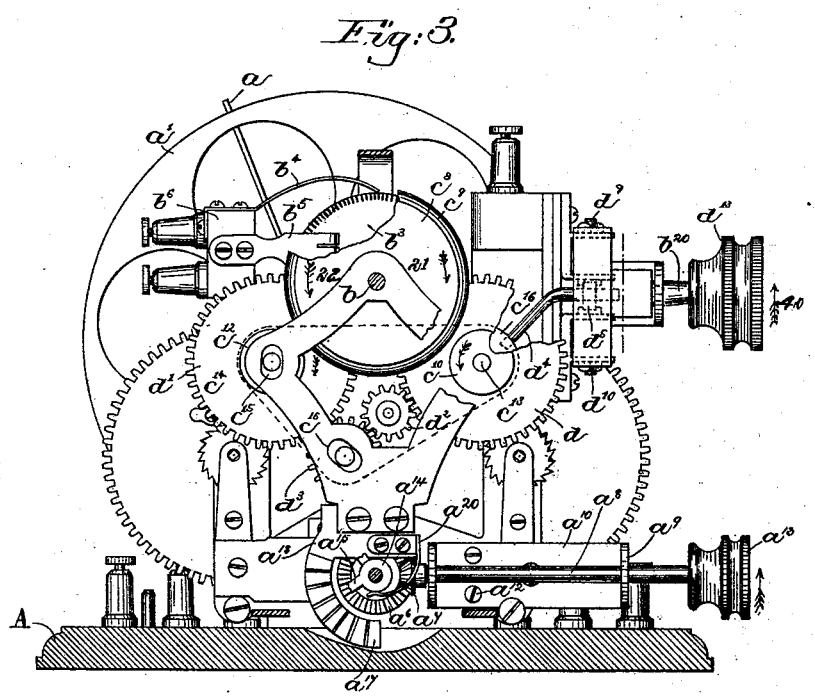
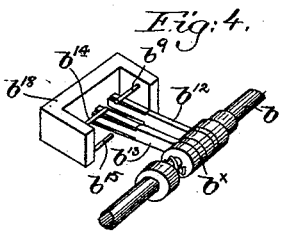
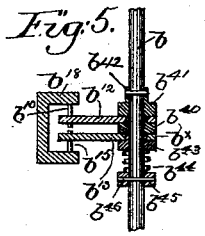
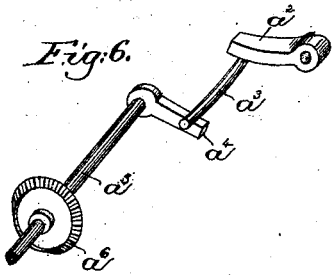
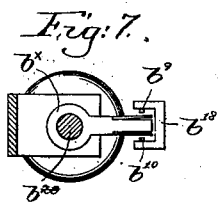
Witnesses.
Howard F. Eaton.
Frederick L. Emery.
Inventors:
William H. Hollar,
Frederick S. Holmes,
by Crosby & Gregory
attys (No Model.) 3 Sheets—Sheet 3.

W. H. HOLLAR & F. S. HOLMES.
ELECTRIC LOCK.

No. 477,897. Patented June 28, 1892.

Fig. 8.

Witnesses:
George C. Hunting
Edward F. Allen

Inventors
Frederick S. Holmes,
William H. Hollar;
by Lemby & Gregory Attys

UNITED STATES PATENT OFFICE.

WILLIAM H. HOLLAR, OF ELIZABETH, NEW JERSEY, AND FREDERICK S. HOLMES, OF MALDEN, MASSACHUSETTS, ASSIGNORS TO JAMES W. TORREY, OF MERCHANTVILLE, NEW JERSEY.

ELECTRIC LOCK.

SPECIFICATION forming part of Letters Patent No. 477,897, dated June 28, 1892.

Application filed February 3, 1890. Serial No. 338,954. (No model.)

*To all whom it may concern:*

Be it known that we, WILLIAM H. HOLLAR, of Elizabeth, county of Union, State of New Jersey, and FREDERICK S. HOLMES, of Malden, county of Middlesex, State of Massachusetts, have invented an Improvement in Lock-Controlling Apparatus, of which the following description, in connection with the accompanying drawings, is a specification, like letters and figures on the drawings representing like parts.

This invention has for its object to provide apparatus constructed as will be described by which electrically-actuated combination-locks may be controlled.

The particular features in which our invention consists will be pointed out in the claims at the end of this specification.

Figure 1 is a front elevation of a controlling apparatus embodying this invention; Fig. 2, a top or plan view of the apparatus shown in Fig. 1; Fig. 3, a transverse section of the apparatus shown in Fig. 2 on line $x\ x$; Figs. 4 and 5, details of a modified form of pole-changer to be referred to, Fig. 5 being a transverse section of Fig. 4; Fig. 6, a detail of a brake mechanism to be referred to; Fig. 7, a detail of the pole-changer shown in Fig. 2, and Fig. 8 a diagram of circuits to be referred to.

Referring to Figs. 1, 2, and 3, A represents a base of wood or other suitable material, to which are secured uprights $A'\ A^2\ A^3$, constituting a frame-work to support the working parts of my improved controlling apparatus, as will be described. The uprights $A^2\ A^3$ form bearings for the shafts of a clock or other time-movement, which may be of any usual or well-known construction, it being shown as provided with a fan $a$, having secured to or forming part of it a brake wheel or disk $a'$, with which co-operates a brake-shoe $a^2$, (see Figs. 2 and 6,) the said brake-shoe being pivoted to the upright $A^3$ and having secured to or forming part of it, as herein shown, a rod $a^3$, normally resting upon a dog or arm $a^4$ on a shaft $a^5$, provided with a bevel-gear $a^6$. The bevel-gear $a^6$ meshes with a bevel-pinion $a^7$, mounted on a shaft $a^8$, having bearings in arms $a^9$ of a bracket $a^{10}$, secured, as shown, to the upright $A^2$ by screws $a^{12}$, the said shaft being provided, as shown, with a thumb-piece or handle $a^{13}$, by rotating which the shaft $a^8$ may be turned to engage the brake-shoe $a^2$ with the periphery of the disk $a'$ to stop the clock-work and to disengage the said brake-shoe from the said disk to start the clock-work. The shaft $a^5$ has mounted upon it, as herein shown, a hub $a^{14}$, provided with an arm $a^{15}$, to which is secured a commutator-brush $a^{16}$, which co-operates with a commutator composed of a series of segments or contact plates or strips $a^{17}$, secured, as shown, to a block or piece $a^{18}$ of insulating material, the said insulating-block having secured to it a contact-arm $a^{20}$, bearing upon the hub $a^{14}$. The insulating-block $a^{18}$, as herein shown, has secured to it seven commutator-strips $a^{17}$, marked "1, 2, 3, 4, 5, 6, 7," each commutator-strip forming one terminal of an electric circuit, the co-operating terminal of which is the brush $a^{16}$. It will be understood that the commutator-strips serve to switch the current to the different circuits connecting therewith and extending to the different safes or vaults. The insulating-block $a^{18}$ has also secured to it, as herein shown, a segment marked "O," which is not connected in an electric circuit, and with which the brush $a^{16}$ co-operates when the pointer is at "O."

The uprights $A'\ A^2$ form journal-bearings for a shaft $b$, to which is secured a pointer or index $b'$, co-operating with a graduated dial $b^2$, the said shaft having mounted on it a break or commutator wheel $b^3$, (see Fig. 3,) which may be of any ordinary construction, but which in the present instance is shown as a toothed wheel provided with insulation between said teeth, the said wheel having as many teeth as there are graduations on the dial $b^2$. The break-wheel $b^3$ has co-operating with it two contact pens or brushes $b^4\ b^5$, secured to a block $b^6$ of insulating material, supported by the uprights $A^2\ A^3$. The brush $b^5$ is connected by a wire 60 (see Fig. 8) to the arm $a^{20}$, and the brush $b^4$ is connected by a wire 61 and branch wires 62 63 to two poles or contact-points $b^9\ b^{10}$ of a pole-changer, which may be of any usual construction, but which is herein shown in Figs. 2, 7, and 8 as consisting of two arms $b^{12}\ b^{13}$, provided with contact-surfaces on their upper and lower sides, the said arms being secured to or forming part of a hub $b^\times$ of insulating material, mounted on a shaft $b^{20}$, the ends of the said arms being movable between the contact-points $b^9\ b^{10}$ (see Fig. 7) and a second set of contact points or poles $b^{14}\ b^{15}$, only one of which is shown by dotted lines, Fig. 2, the said contact points or poles being formed by pins extended through the top and bottom of a piece $b^{18}$ of insulating material. (See Fig. 7.)

The shaft $b$ is rotated in opposite directions (indicated by arrows 20 and 21) by means of a reversing mechanism consisting, as herein shown, of a disk $c^8$, of insulating material, provided with a rubber band or tire $c^9$, with which co-operates two friction-hubs $c^{10}\ c^{12}$ (see Fig. 3) on shafts $c^{13}\ c^{14}$, having one end extended into slots $c^{15}$ in the upright A, only two of which are shown in Fig. 3, and their other ends joined by a plate $c^{16}$. (Indicated by dotted lines, Fig. 3.) The shafts $c^{13}$ $c^{14}$ have mounted on them gears $d\ d'$, rotated in opposite directions by pinions $d^2\ d^3$, in mesh with each other, the pinion $d^2$ meshing with the gear $d$ and the pinion $d^3$ with the gear $d'$, the pinion $d^2$ being driven by the clock-work and the pinion $d^3$ having one journal extended into a slot $c^{15}$ in the upright A' and its other journal mounted in the plate $c^{16}$. The plate $c^{16}$ has secured to or forming part of it a rod $d^4$, having one end extended through a slot or opening in an arm $d^5$, fast on the shaft $b^{20}$. The shaft $b^{20}$ is normally maintained in such position as to keep the friction-hubs $c^{10}\ c^{12}$ out of contact with the friction-disk $c^8$, as herein shown, by means of spring-actuated rods $d^9\ d^{10}$, normally bearing against the opposite sides of the arm $d^5$. The shaft $b^{20}$ is provided, as shown, with a thumb-piece or handle $d^{13}$, by which the said shaft may be rotated in one direction—for instance, as indicated by arrow 40, (see Figs. 1 and 3)—and when so rotated the arm $d^5$, fast on the shaft $b^{20}$, is turned upward and the rod $d^4$ lifted, thus moving the friction-hub $c^{10}$ up into contact with the friction-disk $c^8$ and producing rotation of the said disk in one direction, as indicated by arrows 21, Figs. 1 and 3, or the shafts $b^{20}$ may be turned in the direction opposite to that indicated by arrow 40 to depress the rod $d^4$ and bring the friction-hub $c^{12}$ into contact with the friction-disk $c^8$, and thereby produce rotation of the said friction-disk in the direction of arrow 20. As the friction-disk $c^8$ is rotated in either direction the pointer or index $b'$ is rotated in the same direction.

The contact-surfaces on the arms $b^{12}\ b^{13}$ of the pole-changer in practice are connected, respectively, to the positive and negative poles of a battery $b^{100}$. (See Fig. 8.)

The poles $b^9\ b^{10}\ b^{14}\ b^{15}$ in practice are connected in circuit with a polarized electro-magnet $b^{102}$, located in the safe, the said magnet having its armature $b^{103}$ provided with pawls $b^{104}\ b^{105}$ to engage and rotate a ratchet-wheel $b^{106}$, (indicated by dotted lines, Fig. 8,) the rotation of the ratchet-wheel effecting the correct arrangement of a series of tumblers, (not shown, but of ordinary construction,) the said tumblers when properly arranged permitting the bolt mechanism to be operated substantially as shown and described in Letters Patent granted us on the 14th day of October, 1890, No. 438,236.

Instead of the pole-changer shown in Figs. 2 and 7 we may employ the pole-changer shown in Figs. 4 and 5, wherein the shaft $b$ upon which the pointer $b'$ is mounted is shown as provided with two arms $b^{12}\ b^{13}$, secured to or forming part of hubs $b^\times$, loosely mounted on the said shaft, but insulated therefrom, and having their ends movable between the contact-points $b^9\ b^{10}$ and a second set of contact points or poles $b^{14}\ b^{15}$, shown as pins extended through opposite sides of a piece $b^{18}$ of insulating material. The arms $b^{12}\ b^{13}$ are separated by a ring $b^{40}$ of insulating material, and on the opposite side of the arm $b^{12}$ is mounted a hub $b^{41}$, of insulating material, firmly secured to the shaft $b$, as by a pin $b^{42}$. The shaft $b$ also has mounted on it a loose ring $b^{43}$, which is kept pressed against the arm $b^{13}$ by a spring $b^{44}$, encircling the shaft $b$ and located between the ring $b^{43}$ and the hub $b^{45}$, secured to the shaft, as by a pin $b^{46}$.

The contact-arms $b^{12}\ b^{13}$ of the pole-changer are brought in engagement with one set of poles when the shaft $b$ is rotated in one direction and into engagement with the other set of poles as when the shaft $b$ is rotated in the reverse direction.

We claim—

1. In an apparatus for controlling an electrically-actuated combination-lock, a commutator or break wheel, and a co-operating pen or wiper, and a propelling mechanism for said break-wheel, combined with a pole-changer to automatically alternately make and break an electric circuit, substantially as and for the purpose specified.

2. In an apparatus for controlling an electric combination-lock, the combination, with a motor mechanism, of a commutator or break wheel, a pointer to indicate upon a graduated dial the number of times the commutator has closed and broken an electric circuit during a revolution or part revolution, and a mechanism suitable for reversing the direction of motion of the commutator and pointer, substantially as and for the purpose specified.

3. In an apparatus for controlling an electric combination-lock, the combination, with a motor mechanism, of a commutator or break wheel, a pointer to indicate upon a graduated dial the number of times the commutator closes and breaks an electric circuit during a revolution or part revolution, a mechanism suitable for reversing the direction of motion of the commutator and pointer, and a pole-changer designed to be operated by the same mechanism and synchronously with the reversing mechanism, substantially as and for the purpose specified.

4. In an apparatus for controlling an electric combination-lock, the combination, with a motor mechanism, of a commutator or break wheel, a pointer to indicate upon a graduated dial the number of times the commutator has closed and broken an electric circuit during a revolution or part revolution, a mechanism suitable for reversing the direction of motion of the commutator and pointer, a pole-changer designed to be operated by the same mechanism and synchronously with the reversing mechanism, a lever or shaft designed to operate the reversing mechanism and the pole-changer through intermediary mechanical power-transmitting elements, means for manually controlling the mechanical and electrical sections of the machine, substantially as and for the purpose specified, and an electric circuit through which the lock is to be controlled.

In testimony whereof we have signed our names to this specification in the presence of two subscribing witnesses.

WILLIAM H. HOLLAR.
FREDERICK S. HOLMES.

Witnesses:
GEO. W. ADAMS,
BENJ. S. BANK.